United States Patent [19]

Fuse et al.

[11] Patent Number: 5,383,230
[45] Date of Patent: Jan. 17, 1995

[54] RELOAD-TIMER/COUNTER CIRCUIT

[75] Inventors: Takeshi Fuse, Yokohama; Osamu Tago, Kawasaki, both of Japan

[73] Assignee: Fujitsu Limited, Kawasaki, Japan

[21] Appl. No.: 110,649

[22] Filed: Aug. 9, 1993

Related U.S. Application Data

[63] Continuation of Ser. No. 759,978, Sep. 17, 1991, abandoned, which is a continuation of Ser. No. 371,179, Jun. 26, 1989, abandoned.

[30] Foreign Application Priority Data

Jun. 28, 1988 [JP] Japan ................. 63-162093

[51] Int. Cl.⁶ ................. G06F 5/78; G06F 1/14; H03K 21/00
[52] U.S. Cl. ................. 377/44; 377/52; 377/55; 377/56; 377/110; 364/569; 364/942.7; 368/113
[58] Field of Search ............ 377/20, 39, 44, 26, 377/54–56, 67, 70, 75, 77, 114, 115, 111, 119; 328/129.1, 130.1; 364/569, 242, 942.7; 368/113, 156

[56] References Cited

U.S. PATENT DOCUMENTS

| | | | |
|---|---|---|---|
| 3,937,932 | 2/1976 | Ahlgren | 377/39 |
| 4,161,787 | 7/1979 | Groves et al. | 377/20 |
| 4,408,272 | 10/1983 | Walters | 377/77 |
| 4,450,521 | 5/1984 | McDonough et al. | 364/247.2 |
| 4,538,235 | 8/1985 | Henning | 377/20 |
| 4,686,691 | 8/1987 | Deal et al. | 377/70 |
| 4,879,733 | 11/1989 | Burch et al. | 377/44 |
| 4,939,755 | 7/1990 | Akita et al. | 377/39 |
| 4,942,559 | 7/1990 | Fleck et al. | 377/44 |
| 5,081,297 | 1/1992 | Lebel et al. | 364/569 |

FOREIGN PATENT DOCUMENTS

| | | |
|---|---|---|
| 0180196 | 5/1986 | European Pat. Off. |
| 59-111420 | 6/1984 | Japan . |
| 63-123218 | 5/1988 | Japan . |

OTHER PUBLICATIONS

G. J. Stephens—"Programmable Event Timer" IBM Technical Disclosure Bulletin—vol. 22—No. 2—Jul. 1979—pp. 785–786.

H. D. Bryce, "Versatile programmable module meets $\mu P$ timing needs," EDN, vol. 25, No. 18, Oct. 1980, pp. 145–153.

B. Huston, "On–chip peripherals simplify system hardware and software," WESCON CONFERENCE RECORD, vol. 24, Sep. 16–18, 1980, pp. 1–9.

Primary Examiner—William L. Sikes
Assistant Examiner—Tai V. Duong
Attorney, Agent, or Firm—Armstrong, Westerman, Hattori, McLeland & Naughton

[57] ABSTRACT

A reload-timer/counter circuit provides a reload-timer function and a counter function commonly and selectively. The circuit is comprised of first, second, third, and fourth registers. The third and fourth registers act as a control status register and a mode register, respectively. The first and second registers act as, in the reload-timer mode a data register and a counter register, respectively, while in the counter mode, the first and second registers act as the counter registers.

27 Claims, 12 Drawing Sheets

Fig.11

| 7 | 6 | 5 | 4 | 3 | 2 | 1 | 0 |
|---|---|---|---|---|---|---|---|
| — (NC) | — (NC) | CK SEL | GAE | TRE | SEL1 | SEL0 | RTC |
|  |  | R/W | R/W | R/W | R/W | R/W | R/W |
|  |  | 0 | 0 | 0 | 0 | 0 | 0 ← INITIAL VALUE |

14

Fig. 12A (INTERNAL CLOCK)

| SEL 1 | SEL 0 | SOURCE CLOCK |
|---|---|---|
| 0 | 0 | 2 μS |
| 0 | 1 | 4 μS |
| 1 | 0 | 8 μS |
| 1 | 1 | 32 μS |

Fig. 12B (EXTERNAL CLOCK)

| SEL 1 | SEL 0 | EDGE POLARITY |
|---|---|---|
| 0 | 0 | — |
| 0 | 1 | RISING |
| 1 | 0 | FALLING |
| 1 | 1 | RISING/FALLING |

RELOAD-TIMER/COUNTER CIRCUIT

This a continuation of Ser. No. 07/759,978 filed Sept. 17, 1991, now abandoned; which is a continuation of parent application Ser. No. 07/371,179 filed Jun. 26, 1989, now abandoned.

BACKGROUND OF THE INVENTION (1) Field of the Invention

The present invention relates to a reload-timer/counter circuit which is mounted in a peripheral unit formed inside a one-chip microcontroller.

In recent years, one-chip microcontrollers have been increasingly manufactured, which one-chip microcontrollers contain therein a central processing unit (CPU), A read-only memory (ROM), a random-access memory (RAM), a peripheral unit therefor and so on in the form of a single chip.

As known, a reload-timer is comprised of a counter for counting an internal clock to produce a timer interrupt when the count value reaches a predetermined value. On the other hand, a counter works as a so-called event counter which counts an external clock and, when the count value overflows, a certain flag is set in a related status register.

Although the reload-timer and the counter have no particular relation therebetween, both the reload-timer and the counter are generally located close to each other in the peripheral unit of the one-chip microcontroller to form a reload-timer/counter circuit.

2. Description of the Related Art

As mentioned above, the reload-timer/counter circuit provides two major functions, i.e., a timer function and a counter function therefore, as understood later, it is necessary for the circuit to comprise at least six independent registers to construct the same. However, too many registers cannot satisfy a recent demand for reduction of the number of logic gates and also reduction of cost per each function, due to miniaturization of the one-chip controller.

In actuality, however, it is not easy to satisfy the above mentioned demand due to the nature of a reload-timer/counter circuit. That is, in accordance with the made of operation required by a user, in one case, only the counter function is needed, and in an other case, only the timer function is needed. Thus, either one of the counter function or the timer function is not needed by certain users. Nevertheless, the related circuit is usually so designed as to provide both the timer function and the counter function simultaneously. This means that the reload-timer/counter circuit necessarily contains unused register parts comprising the timer or the counter, and the related logic gate parts which are not needed by the user. Thus, a problem arises that such unused register and logic gate parts increase manufacturing costs for each function and also limit availability for general purpose use.

SUMMARY OF THE INVENTION

Accordingly, an object of the present invention is to provide a reload-timer/counter circuit which can be used as a reload-timer or counter selectively according to a user's need, without constructing both the reload-timer function part and the counter function part independently, so that the manufacturing cost for each function can be reduced.

To attain the above object, the reload-timer/counter circuit according to the present invention is comprised of first through fourth registers, the first and second registers are operative to realize, in one case, an inherent reload-timer function, and in an other case, an inherent counter function selectively, and the remaining third and fourth registers are operative to switch the mode of the first and second registers between the two functions. Particularly, the third register is used to perform an operation control and the fourth register is used to perform a mode control.

BRIEF DESCRIPTION OF THE DRAWINGS

The above object and features of the present invention will be more apparent from the following description of the preferred embodiments with reference to the accompanying drawings, wherein:

FIG. 11 depicts a bit arrangement in the mode register;

FIGS. 12A and 12B depict characteristics of SEL1 and SEL0;

DESCRIPTION OF THE PREFERRED EMBODIMENTS

Before describing the embodiments of the present invention, the related art and the disadvantages therein will be described with reference to the related figures.

Figure 1:
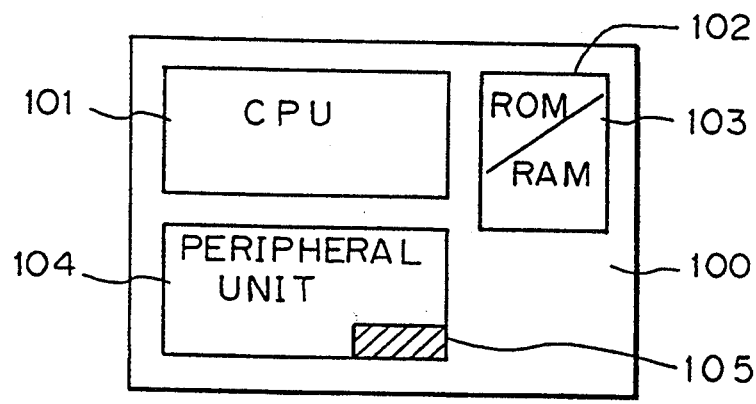
FIG. 1 is a general block diagram of a known electronic apparatus to which the present invention is adopted.

FIG. 1 is a general block diagram of a known electronic apparatus to which the present invention is adopted. For example, the electronic apparatus is constructed as a one-chip microcontroller 100. The one-chip microcontroller 100 is set up with at least a central processing unit (CPU), a read-only memory (ROM) 102, a random access memory (RAM) 103 and a peripheral unit 104. The reload-timer/counter circuit 105 to which the present invention is applied is mounted in the peripheral unit 104.

Figure 2:
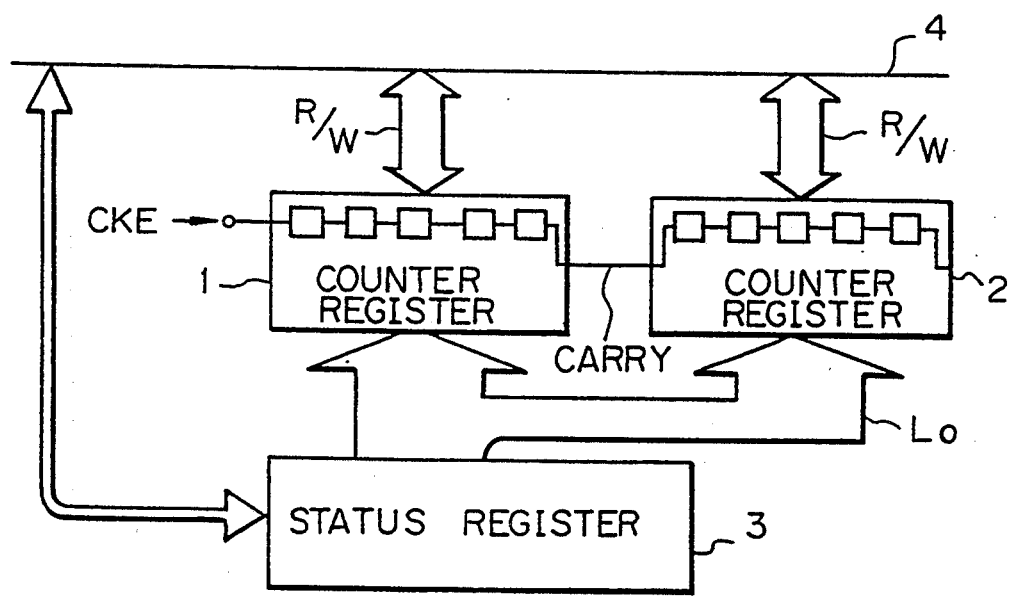
FIG. 2 is a block diagram of a counter part comprising a prior art reload-timer/counter circuit.

FIG. 2 is a block diagram of a counter part comprising a prior art reload-timer/counter circuit. In FIG. 2, reference numerals 1 and 2 represent counter registers, and 3 a status register. The status register 3 provides various functions such as turning ON or OFF the count operation of the counter registers 1 and 2 and controlling an interrupt for read or write operation and the like. Further, reference R/W denotes a read/write data line, and $L_0$ a control line.

The counter register 1 of, for example 8 bits receives an external clock CKO, and is comprised of latch stages connected in tamdem. The counter register 2 has an identical construction to that of the counter register 1, but receives a carry signal, at its input, from the counter register 1. Each of the read/write data lines R/W is usually used as a read data line, but when, for example, an offset count value is needed, the related offset data is written from the CPU 101 via the write data line R/W.

Figure 3:
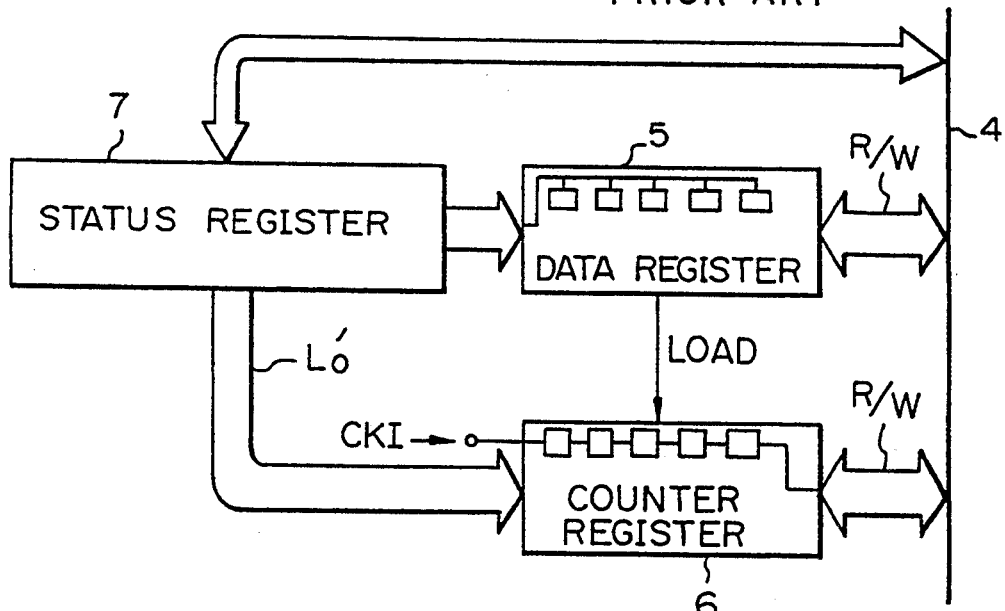
FIG. 3 is a block diagram of a reload-timer part comprising a prior art reload-timer/counter circuit.

FIG. 3 is a block diagram of a reload-timer part comprising a prior art reload-timer/counter circuit. In FIG. 3, reference numeral 5 denotes a data register for holding reload data, 6 a counter register and 7 a status register. The meaning of reference $L_0$ is similar to $L_0$ explained with reference to FIG. 2, and R/W is also identical to that shown in FIG. 2. The counter register 6 has an identical construction to that of the counter registers 1 and 2 shown in FIG. 2, but the register 6 counts an internal clock CK1. Incidentally, there are four clocks CKI having different speeds. Thus, the counter register 6 usually outputs read data to the CPU 101 via the line R/W. The register 6 is loaded with data from the data register 5, which data specifies an interval length of, for example, interrupts generated periodically. Thus, the read/write data line R/W, cooperating with the data register 5, is usually used as a write data line for transferring the reload data from the CPU 101. It should be understood that the data register 5 is not comprised of latch stages connected in tandem, as are the register 1, 2 and 6, but is comprised of latch stages each of which is independent from the others.

As is apparent from FIGS. 2 and 3, the prior art reload-timer/counter circuit requires as many as six independent registers (1, 2, 3, 5, 6, 7), so that the prior art reload-timer/counter circuit occupies a relatively large area in a semiconductor chip in which it is mounted. The nature of the reload-timer/counter circuit makes it more difficult to overcome the above disadvantage, i.e., occupation of a large area in the chip. Accordingly, the previously mentioned problem arises which is to be overcome by the present invention and which will be explained in detail below.

Figure 4:
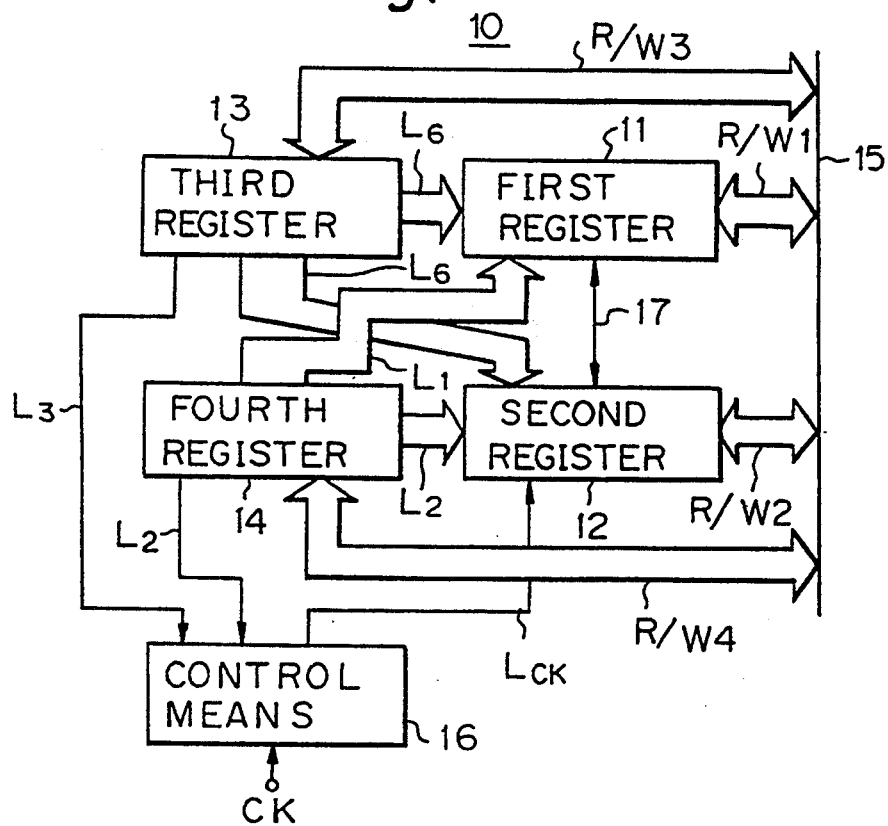
FIG. 4 is a principle block diagram of a reload-timer/counter circuit according to the present invention.

FIG. 4 is a principle block diagram of a reload-timer/counter circuit according to the present invention. The reload-timer/counter circuit 10 is mainly comprised of a first register 11, a second register 12, a third register 13 and a fourth register 14. Data to be read from and rewritten to these registers 11 through 14 is communicated to the CPU 101 via a data bus 15. Reference numeral 16 denotes a control means which mainly handles a clock signal CK and 17 a data/control line. To be specific, the first register 11 and the second register 12 are interconnected by the data/control line 17.

The third register 13 controls an operation the first and second registers.

The fourth register 14 carries out a function mode control the first and second registers. The control means 16 selects a clock signal CK to be supplied to the second register. Thus, the first and second registers 11, 12 are integrally operated, to carry out a reload-timer function or a counter function selectively in accordance with information stored in the third and fourth registers 13, 14.

Further, in the reload-timer/counter circuit 10, each of the first through fourth registers 11, 12, 13 and 14 is directly connected to the data bus 15 to enable an independent data communication thereof with a central processing unit (CPU) 101. The operation according to the present invention is as follows. The fourth register 14 carries out a function mode control, so that the register 14 sets the first register 11 as a data register (11a) and also sets the second register 12 as a counter register (12a). On the other hand, the third register 13 carries out an operation control, so that the register 13 enables starting OF the first and second registers 11 and 12 to operate in the reload-timer mode by selecting, for example, a clock mode.

Alternatively, the fourth register 14 carries out another function mode control, so that the register 14 sets the first and second registers 11 and 12 as counter registers (11b and 12b) and a carry transfer line (L4) is connected therebetween. The third register 13 controls starting of the registers (11b and 12b), and thereby the counter mode is created.

As clear from the above, the two functions, i.e., the reload-timer function and the counter function, can be carried out by the use of four registers 11, 12, 13, and 14. This reduces the size of the logic circuit and the manufacturing cost, compared with the prior art circuit (FIGS. 2 and 3).

Figure 5:
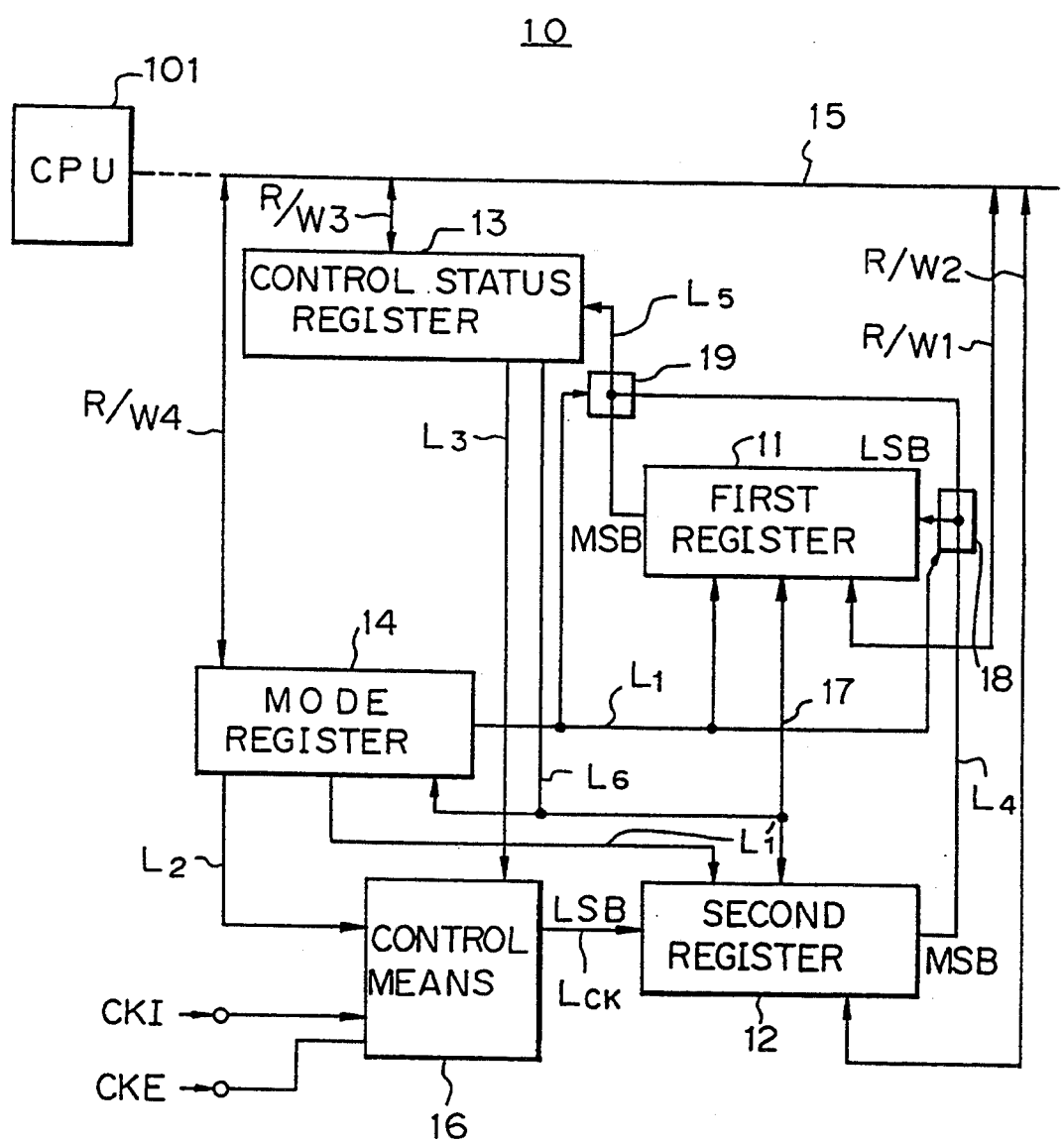
FIG. 5 is a block diagram of an embodiment according to the present invention.

FIG. 5 is a block diagram of an embodiment according to the present invention. In FIG. 5, the first register 11 acts as a data/counter register which is, for example, an 8-bit register and operates to have data read out or written in. In an 8-bit reload timer mode, the first register 11 acts as a data register, but in a 16-bit mode, the register, 11 acts as a counter register.

The second register 12 acts as a counter register which is, for example, an 8-bit register and operates to have data read out or written in. In an 8-bit reload-timer mode and a 16-bit mode, the second register acts as a counter register.

The third register 13 functions as a control status register to specify a mode of control and control operation of the first, second, and fourth registers 11, 12, and 14. The register 13 is, for example, a 8-bit register. The fourth register 14 functions as a mode register for specifying either the reload-timer mode or the counter mode in accordance with the user's need, which register 14 is, for example, a 8-bit register.

The data bus 15 transfers data to or from the CPU 101.

The control means 16 is subjected to control by the control status register 13 and the mode register 14 by way of a start control line $L_3$ and an operation control line $L_2$, respectively, so as to select either the internal clock CKI or the external clock CKE. The thus selected clock (CKI or CKE) is supplied, via a clock line $L_{ck}$, to the second register 12. Incidentally, the internal clock CKI includes, for example, four different source clocks having, as their period, 2, 4, 8 and 32 ($\mu$s).

The data/control line 17 operates, on one hand, to transfer the reload data from the register 11 to the register 12, and one the other hand, to transfer control information from the control status register 13.

The read/write data lines R/W 1 through R/W 4 connect the data bus 15 to the registers 11 through 14, respectively. The lines $L_1$ and $L_1'$ work as mode switching lines, the line $L_2$ works as an operation control line, the line $L_3$ works as a start control line, $L_4$ a carry transfer line, $L_5$ a request for interrupt line, and $L_6$ a control line.

The reload-timer/counter circuit 10 is further comprised of a first switch 18 and a second switch 19, whereby in the reload-timer mode, the first and second switches 18, 19 connect the output of the second register 12 acting as a counter register 12a, to the input of the third register 13 acting as a control status register 13a, and in the counter mode, the first switch 18 connects the output of the second register 12 acting as a counter register 12b, to the input of the first register 11 acting as a counter register 11b, and the second switch 19 connects the output of the first register 11 to the input of the third register 13 acting as a control status register. The first and second switches 18, 19 are controlled in accordance with information supplied by the fourth register 14 acting as a mode register.

Figure 6:
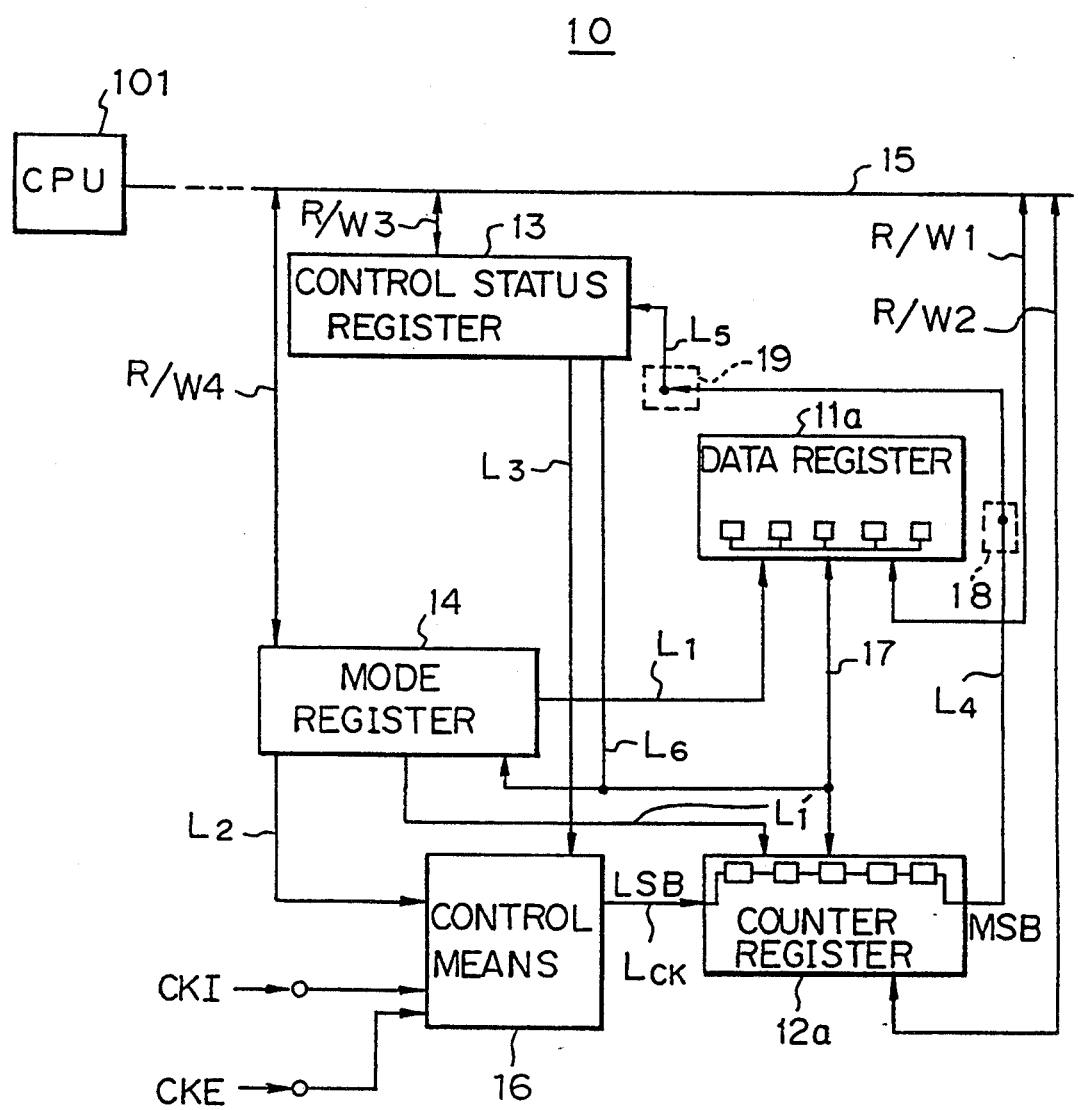
FIG. 6 is a block diagram of an embodiment, in a reload-timer mode, according to the present invention.

FIG. 6 is a block diagram of an embodiment, in a reload-timer mode, according to the present invention. In the reload-timer mode, the first register 11 (FIG. 5) acts as a data register 11a and the carry transfer line $L_4$ is cut off, and thereby a reload-timer function is obtained. Note that, during the reload-timer mode, when a request for interrupt is issued to the control status register can be attained by using the aforesaid carry transfer line $L_4$ and the interrupt request line $L_5$.

In the reload-timer mode, the control means 16 selects the internal clock CKI and supplies the same to the counter register 12a. The first register 11 and said second register 12 are connected to the fourth register 14 via respective mode switching lines $L_1$ and $L_1'$, the fourth register is further connected to the control means 16 via the operation control line $L_2$, the control means 16 is further connected to the third register 13 via the start control line $L_3$, and the first, second and fourth registers 11, 12 and 14 are controlled by the third register 13 via respective control lines $L_6$.

Figure 7:
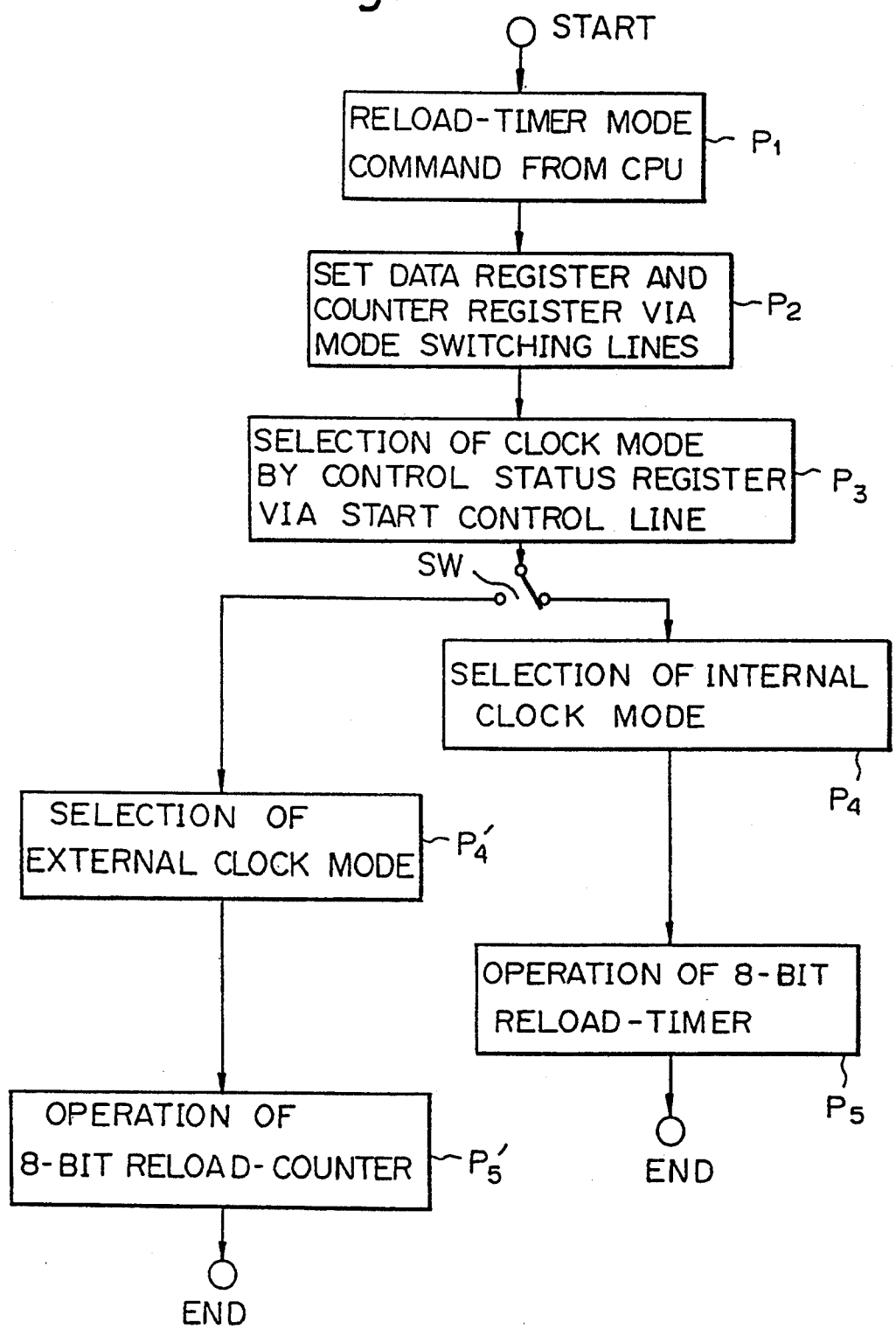
FIG. 7 is a flow chart of an embodiment, in a reload-timer mode, according to the present invention.

FIG. 7 is a flow chart of an embodiment, in a reload-timer mode, according to the present invention. In process $P_1$, according to the demand by a user, a reload-timer mode is commanded from the CPU 101 to the control status register 13 and the mode register 14, via the data bus 15, and the read/write data lines R/W 3 and R/W 4.

In process $P_2$, the mode register 14 operates to set the first and second registers as the data register 11a and the counter register 12a via the mode switching lines $L_1$ and $L_1'$, respectively.

In process $P_3$, the clock mode, i.e., the internal clock CKI or the external clock CKE, is selected by the control status register 13 via the start control line $L_3$.

A switch (SW), located between the processes $P_3$ and $P_4$, $P_4'$ represents a selection by the mode register 14. Usually, line of the processes $P_4$ and $P_5$ are selected.

In process $P_4$, the internal clock CKI is selected to form the reload-timer mode.

In process $P_5$, the reload data is supplied from the data register 11a to the counter register 12a and the count operation is started to carry out the 8-bit reload-timer function.

In some cases, the external clock CKE is selected, as shown in process $P_4'$.

In this case, the second register 12 functions as a reload-counter instead of the reload-timer, as shown in process $P_5'$.

Figure 8:
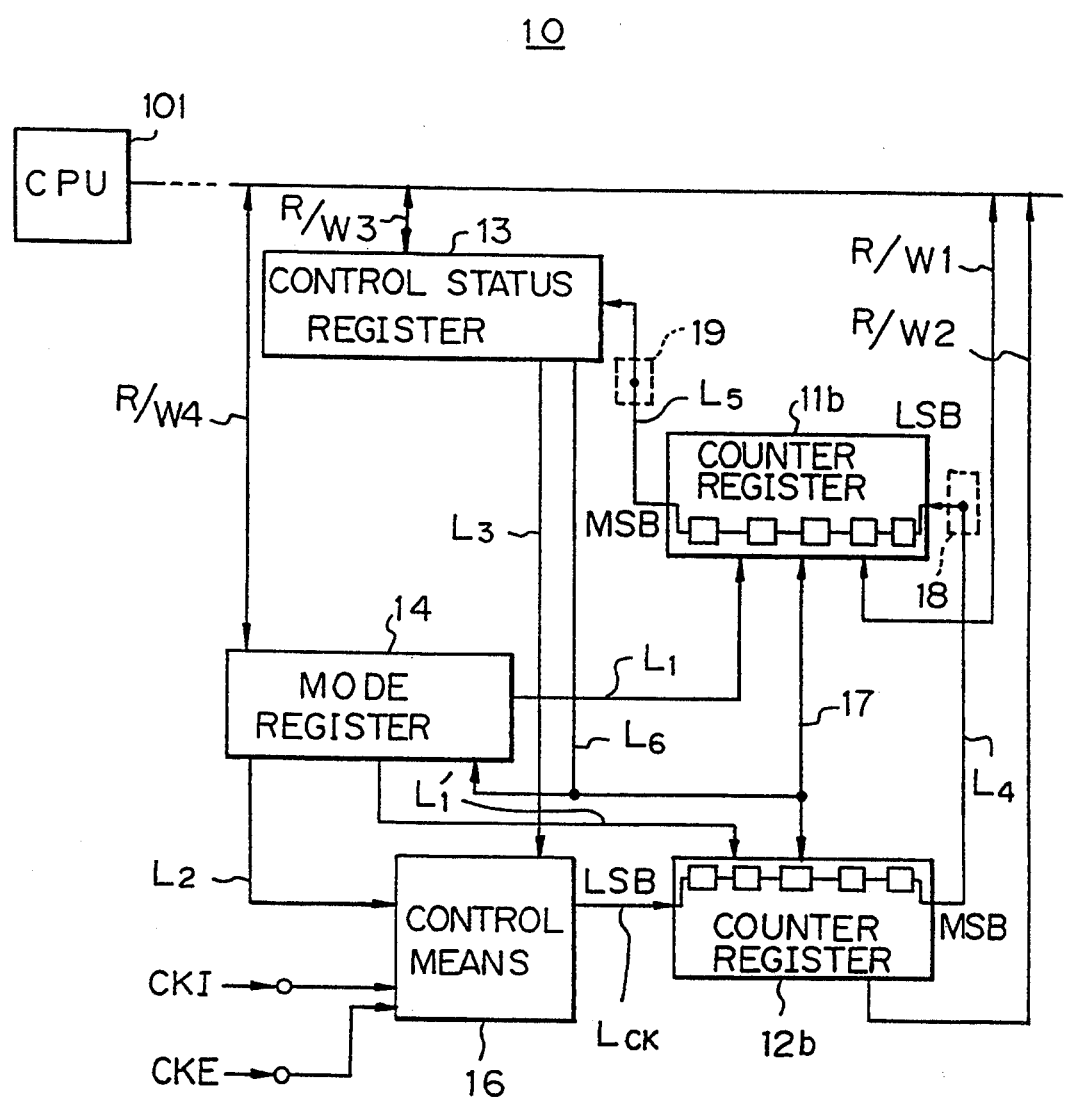
FIG. 8 is a block diagram of an embodiment, in a counter mode, according to the present invention.

FIG. 8 is a block diagram of an embodiment, in a counter mode, according to the present invention.

In the counter mode, the first register 11 (FIG. 5) acts as a counter register 11b and the second register 12 (FIG. 5) also acts as a counter register 12b. The most significant bit (MSB) of the counter register 12b and the least significant bit (LSB) are interconnected by the carry transfer line $L_4$, so that a counter function can be obtained. Note that, during the counter mode, when a request for interrupt is issued to the control status register 13, the interrupt can be attained by using the interrupt request line $L_5$ connected to the output (MSB) of the register 11b.

In the counter mode, the control means 16 selects the external clock CKE and supplies the same to the counter register 12b. The first register 11 and the second register 12 are connected to the fourth register 14 via respective mode switching lines $L_1$ and $L_1'$, the fourth register is further connected to the control means 16 via the operation control line $L_2$, the control means 16 is further connected to the third register 13 via the start control line $L_3$, and the first, second and fourth registers 11, 12, and 14 are controlled by the third register 13 via respective control lines $L_6$.

Figure 9:
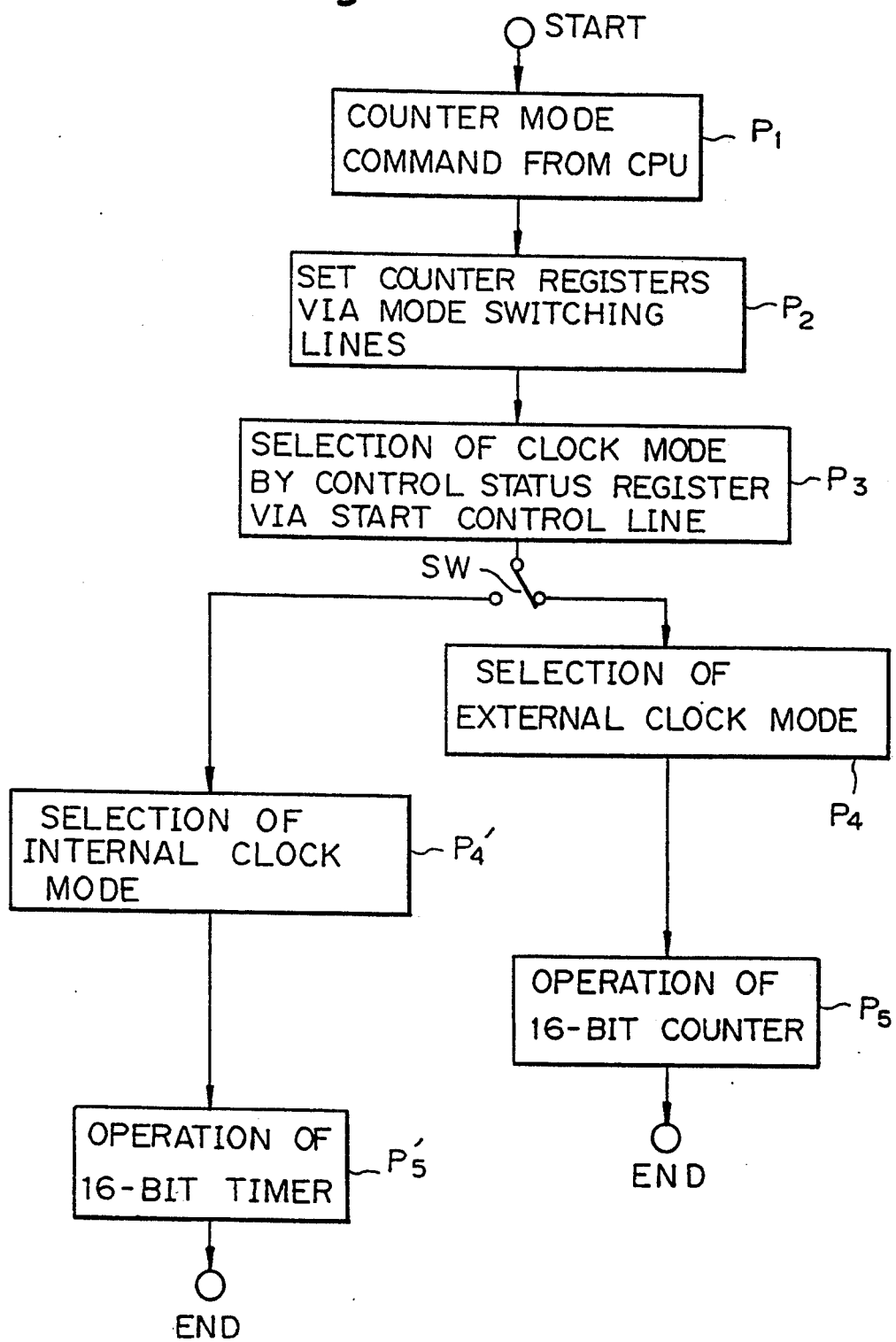
FIG. 9 is a flow chart of an embodiment in a counter mode, according to the present invention.

FIG. 9 is a flow chart of an embodiment, in a counter mode, according to the present invention. In process $P_1$, according to the demand by a user, a counter mode is commanded from the CPU 101 to the control status register 13 and the mode register 14, via the data bus 15, and the read/write data lines R/W 3 and R/W 4.

In process $P_2$, the mode register 14 operates to set the first and second registers as the counter register 11b and the counter register 12b via the mode switching lines $L_1$ and $L_1'$, respectively.

In process $P_3$, the clock mode, i.e., the external clock CKE or the internal clock CKI, is selected by the control status register 13 via the start control line $L_3$.

A switch (SW), located between the processes $P_3$ and $P_4$, $P_4'$ represents a selection by the mode register 14. Usually, lines of the processes $P_4$ and $P_5$ are selected.

In process $P_4$, the external clock CKE is selected to form the counter mode.

In process $P_5$, the counter register 11b and the counter register 12b operate as a 16-bit counter.

In some cases, the external clock CKI is selected, as shown in process $P_4'$.

In this case, the first and second registers 11 and 12 function as a 16-bit timer instead of the counter, as shown in process $P_5'$.

Thus, the mode register 14 is operative to form the first register 11 and the second register 12 as the data register 11a and the counter register 12a, or as the counter register 11b and the counter register 12b. Further, the control status register 13 is operative to start the data register 11a and the counter register 12 or the series connected counter registers 11b and 12b and to select the internal clock CKI or the external clock CKE, so that the reload-timer function or the counter function can be carried out selectively at the will of the user.

It should be recognized here that the reload-timer function and the counter function can be realized selectively with the use of four registers 11, 12, 13, and 14.

Figure 10:
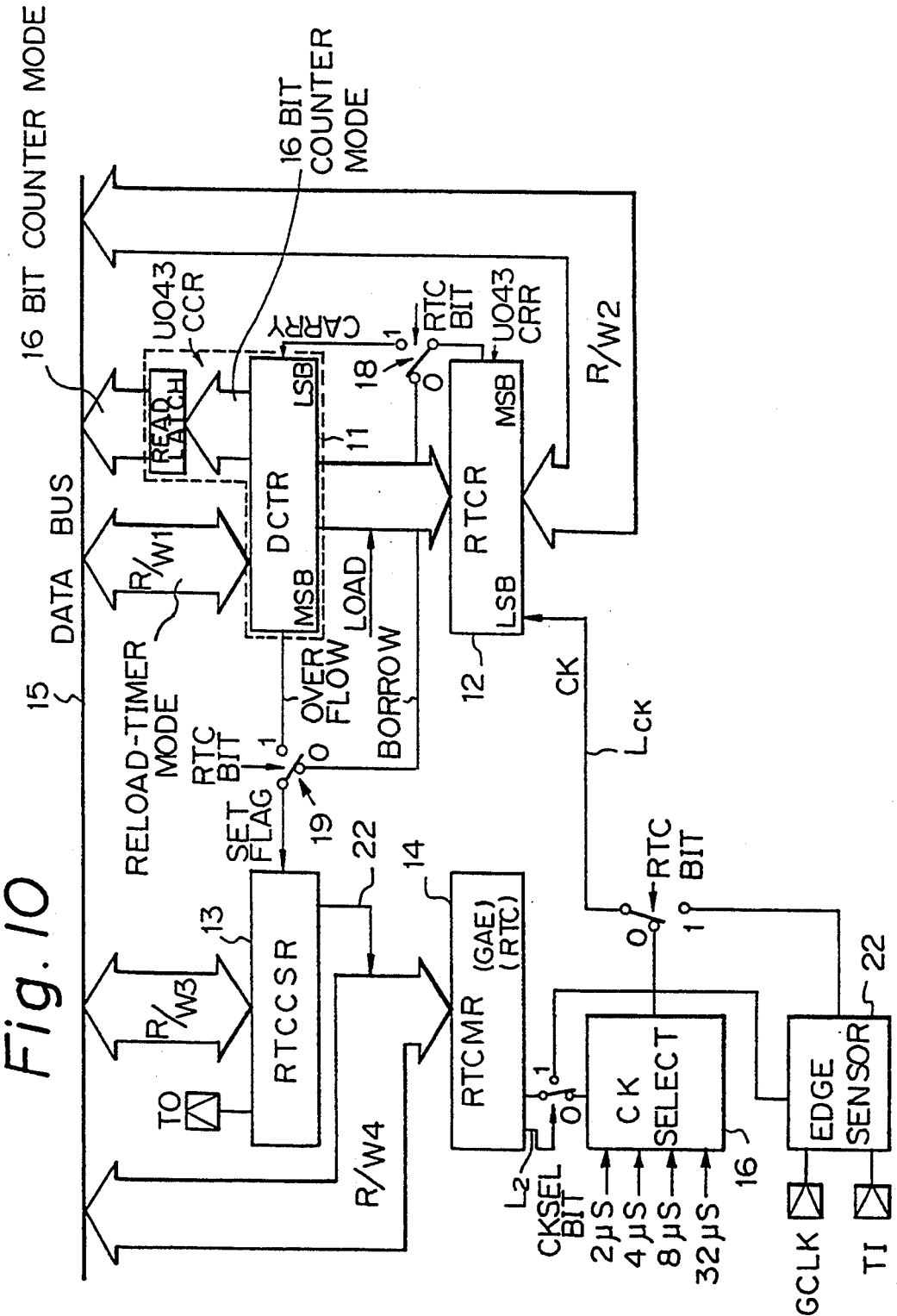
FIG. 10 is a circuit diagram of an embodiment showing more detail than that of FIG. 5, according to the present invention.

FIG. 10 is a circuit diagram of an embodiment showing more detail than that of FIG. 5, according to the present invention. In FIG. 10, members identical to those explained before are referenced by the same numerals or characters. The abbreviation "DCTR" in the register 11 denotes a "data counter register", "RTCR" in the register 12 a "reload-timer/counter register", "RTCCSR" in the register 13 a "reload-timer/counter control status register" and "RTCMR" in the register 14 a "reload-timer/counter mode register". Further, TO denotes a timer output terminal, TI a timer input terminal.

FIG. 11 depicts a bit arrangement in the mode register (RTCMR) 14. The register 14 consists of 8-bits 0 through 7. The register 14 function to set an operation mode. The register 14 can be renewed only when a RTCST bit line 22 from the register 13 exhibits a logic "0". The fifth bit (BIT 5), i.e., a CKSEL, is used to select the internal clock CKI or the external clock CKE, i.e., logic "0" specifies the CKI and logic "1" specifies the CKE.

The fourth bit (BIT 4), i.e., a GAE, is used as a gate enable bit, logic "0" thereof denotes that a gate function mode is not allowed, while "1" denotes that a gate function mode is allowed. There bits relate to an edge sensor 22. The gate clock GCLK valid only when GAE="1". The timer input terminal TI is made invalid only when the GAE="1". The edge sensor 22 is merely an option to the circuit of the present invention, so no detailed explanation will be further given hereinafter.

The third bit (BIT 3) is used as a reload-timer enable bit (TRE). When TRE="0", this represents that the reload is not allowed, but is allowed when TRE ="1". Where TRE="0", after starting the register 11 and loading the data, the reload operation will stop when the count value in the register 12 decreases and reached OOH. When TRE="1", after starting the register 11 and loading the data, the reload operation will start when the count value therein decreases and reaches OOH.

The second bit (BIT 2) and first bit (BIT 1) are used as a selection bit (SEL 1) and a selection bit (SEL 0), respectively. To be specific, these bits are operative to select a source clock frequency, in the internal clock mode, and to select an edge polarity of the external clock, in the external clock mode.

FIGS. 12A and 12B depict characteristics of SEL 1 and SEL 0.

The last bit (BIT 0) is an RTC bit which is used to select the reload-timer mode or the counter mode. Logic "0" thereof indicates the reload-timer mode, while "1" indicates the counter mode.

Figure 13:
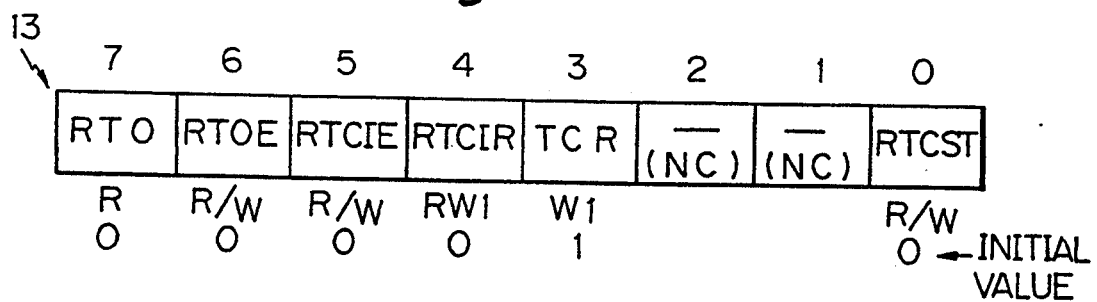
FIG. 13 depicts a bit arrangement in the control status register.

FIG. 13 depicts a bit arrangement in the control status register. The control status register 13 functions to set the mode and control for the reload-timer and the counter. In the bit arrangement the fourth bit (BIT 4) is used as an bit RTCIR bit, when it is "0", of "0" to write and clear other registers.

The seventh bit (BIT 7) is an RTO bit which is effective only in the reload-timer mode. After starting every time the timer exhibits "OOH", the RTO bit is inverted in logic. The bit is used only for being read.

The sixth bit (BIT 6) is an RTOE bit which is effective only in the reload-timer mode. After starting, the RTOE bit is used as an enable bit for the seventh bit (RTO) to output the same at a related port (TO). When RTOE="0", the output terminal TO works as a three state gate, and while RTOE="1", TP produces the RTO level directly as it is.

The fifth bit (BIT 5) is an RTCIE bit which indicates to allow the request for interrupt of the reload-timer and the counter. When RTCIE="0", the interrupt is not allowed, but when RTCIE="1" and at the same time the fourth bit (BIT 4) is set with logic "1", the interrupt is allowed.

The fourth bit (BIT 4) is an RTCIR bit which is used as a bit for requesting an interrupt from the reload-timer and the counter. In the reload-timer mode, the RTCIR bit indicates the interrupt every time the timer exhibits "OOH". In the counter mode, the RTCIR bit indicates the interrupt every time the counter overflows from, "FFFFH" to "OOOOH".

The third bit (BIT 3) is a TCR bit which is effective only in the counter mode. If logic "0" is written to this bit during an idling state, the register (DCTR) 11 and the register (RTCR) 12 are cleared to "OOH".

The last bit (BIT 0) is an RTCST bit which can switch the starting and the stopping of the operation of the reload-timer or the counter. When RTCST="0", the reload-timer or the counter is stopped, and when RTCST="1" the reload-timer or the counter is started.

In the reload-timer mode, while the register (RTCMR) 14 is set, at its bit 3 (TRE), with "0", if the reload-timer counts down to "OOH", the RTCST bit is cleared and the reload-timer stops, i.e., the reload-timer mode ceases.

Figure 14:
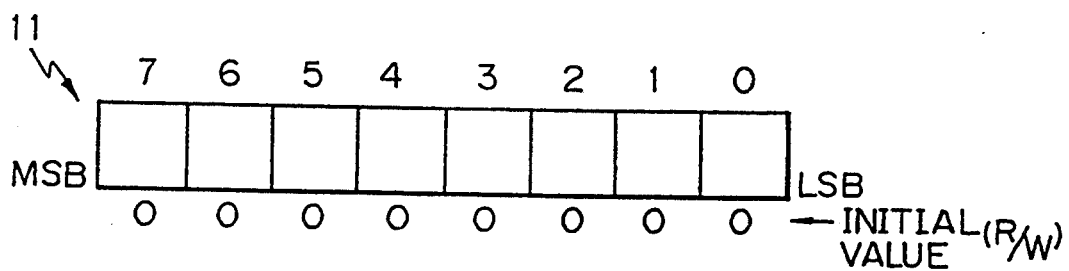
FIG. 14 depicts a bit arrangement in the first register.

FIG. 14 depicts a bit arrangement in the first register. The first register 11 can achieve a read/write operation. In the reload-timer mode, the register 11 functions as a data register. The data in the register 11 is loaded in the register (RTCR) 12 when the timer is to be started or at the timer overflow occurs during a reload enable term. In the counter mode, the register 11 functions as a higher byte register which starts counting when a carry is given from the register 12. During a read operation, the register (DCTR) 11 cannot be read if the register (RTCR) 12 has not yet been read.

Figure 15:
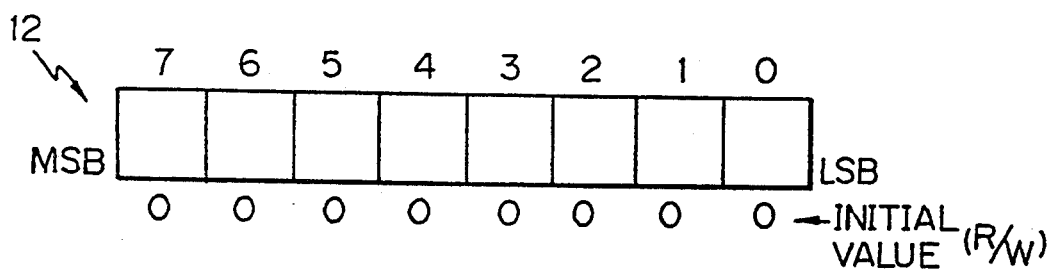
FIG. 15 depicts a bit arrangement in the second register.

FIG. 15 depicts a bit arrangement in the second register. The second register 12 can achieve a read/write operation. In the reload-timer mode, the register (RTCR) 12 acts as a down counter. When the reload-timer is started, the data in the register (DCTR) 11 is loaded therein. Soon after this, the counting down operation starts and eventually reaches "OOH". At this moment, the interrupt request bit is changed to logic "1". Simultaneously, an overflow signal is generated. In the counter mode, the register, thus forming a 16-bit counter together with the register (DCTR) 11. When the overflow from, "OFFFFH" to "OOOOH" occurs, the interrupt request bit is set with "1". Note that when the RTCST bit is "1", the counting operation is continued, and will then stow when the bit changes to "0".

Figure 16:
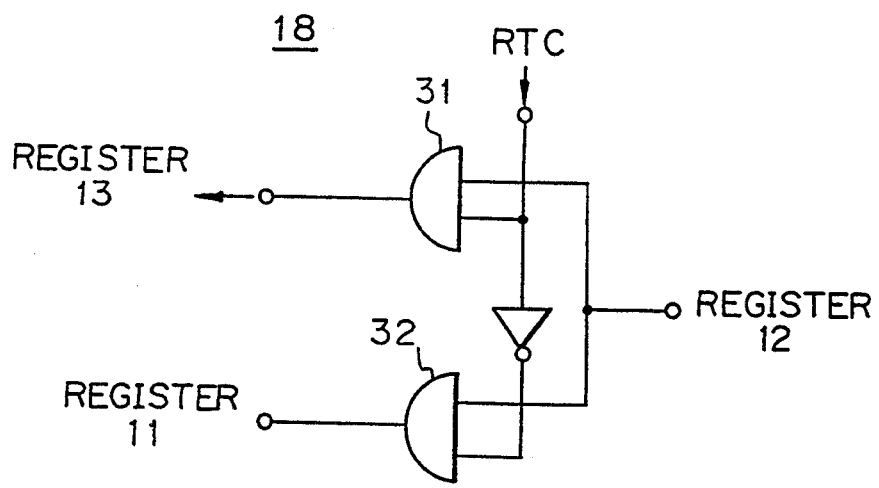
FIG. 16 illustrates an example of the first switch.

FIG. 16 illustrates an example of the first switch. The first 18 comprises complementary first and second AND gates 31 and 32.

Figure 17:
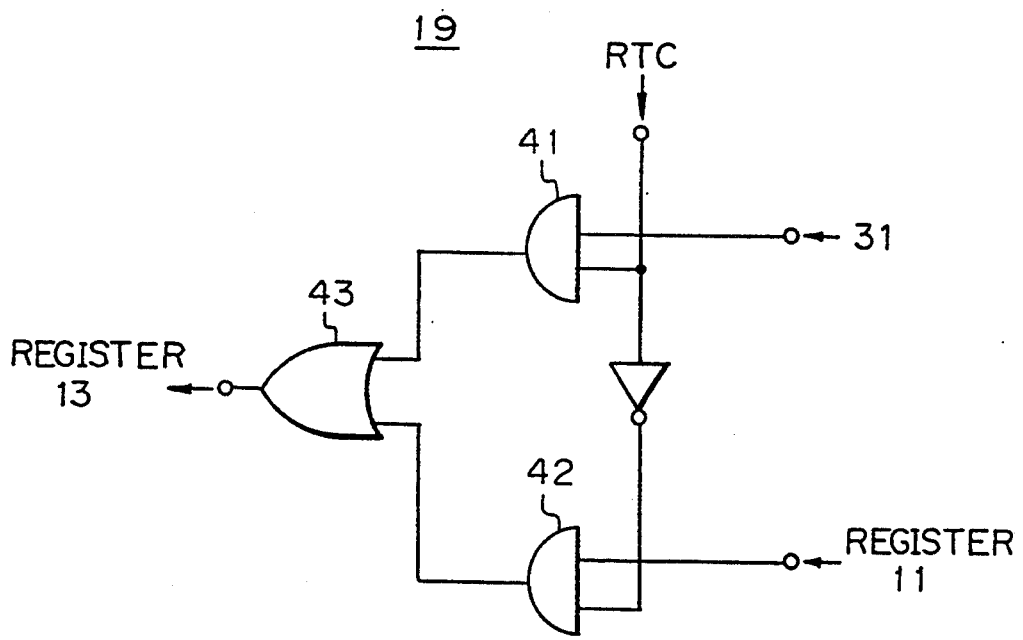
FIG. 17 illustrates an example of the second switch.

FIG. 17 illustrates an example of the second switch. The second switch 19 comprises complementary first and second AND gates 41 and 42, and an OR gate 43 receiving the outputs thereof.

In FIGS. 16 and 17, the first AND gates 31 and 41 are operated in the reloaded-timer mode, while the second AND gates 32 and 42 are opened in the counter mode.

Figure 18:
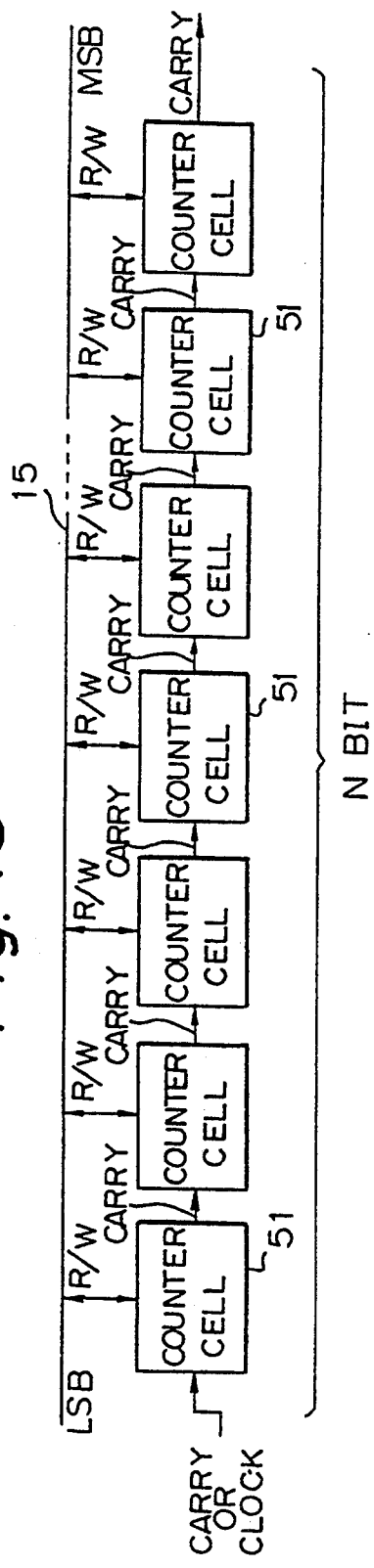
FIG. 18 illustrates an example of a register acting as a counter register.

FIG. 18 illustrates an example of a register acting as a counter register.

Figure 19:
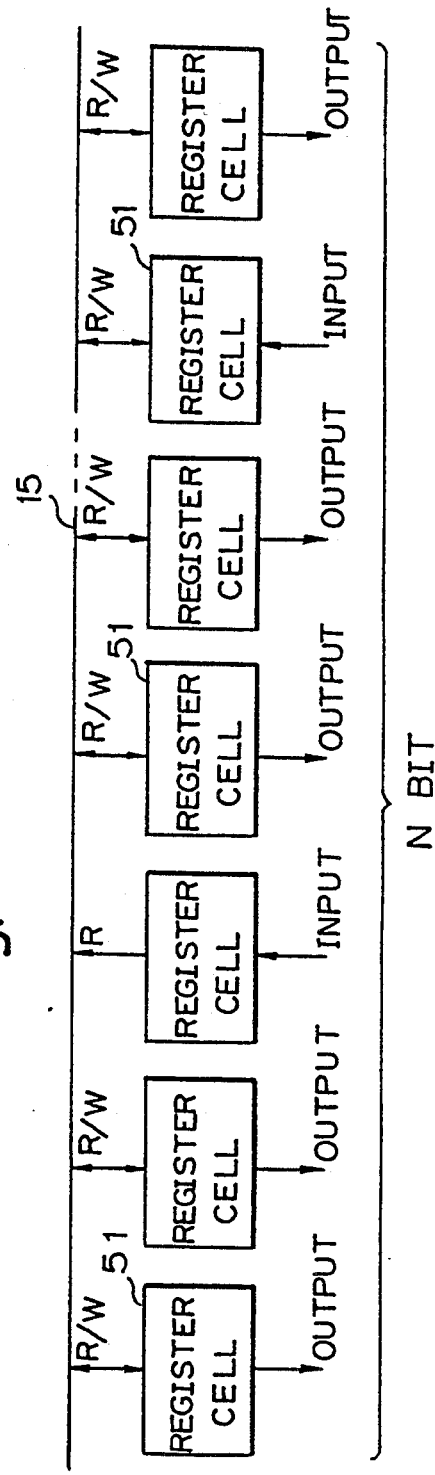
FIG. 19 illustrates an example of a register acting as a data register.

FIG. 19 illustrates an example of a register acting as a data register.

Referring to both FIGS. 18 and 19, in the reloaded-timer mode, each of the first, third, and fourth registers 11, 13, and 14 is constructed but a plurality of latch stages 51, each of the latch stages 51 is connected independently with the data bus 15, the latch stages for constructing the first, third and fourth registers, 11, 13, and 14 are formed as register cells (see FIG. 19), where there is no carry transfer between each pair of adjacent latch stages from a lower bit side latch cell to a higher bit side latch cell, while the latch stages for constructing the second register 12, are formed as counter cells (see FIG. 18), where a carry transfer is carried out between each pair of adjacent latch stages from a lower bit side latch stage to a higher bit side latch stage.

Referring to both FIGS. 18 and 19, in the counter mode, each of the first and second registers 11, 12 is constructed by a plurality of latch stages 51, each of the latch stages 51 is connected independently to the data bus (15), the latch stages for constructing each of the first and second registers 11 and 12 are formed as counter cells (see FIG. 18), where a carry transfer is carried out between each pair of adjacent latch stage from a lower bit side latch stage to a higher bit side latch stage. While, the latch stages 51 for constructing the third and fourth registers 13 and 14, are formed as register cells (see FIG. 19), where there is no carry transfer between each pair of adjacent latch stages from a lower bit side latch cell to a higher bit side latch cell.

As mentioned above in detail, the reload-timer/counter circuit of the present invention can realize a provision of multifunctions, i.e., reload-timer and counter functions, with the use of four registers.

We claim:

1. A reload-timer/counter circuit comprising:
   a first register and a second register interconnected by a data/control line;
   a third register controlling an operation of said first and second registers for initiating a reload-timer/-counter operation, said third register being connected to said first, and second registers along said data/control line;
   a fourth register carrying out a function mode control of said first and second registers for setting said first and second registers as either a data register or a counter register;
   a control means for selecting a clock signal to be supplied to said second register, said control means being connected to said third and fourth registers via a start control line and an operation control line, respectively, so as to select either an internal or an external clock signal;
   first and second switches, whereby in a reload-timer mode, said first and second switches connect an output of said second register, acting as a counter register, to an input of said third register acting as a control status register; and in a counter mode, said first switch connects the output of said second register, acting as a counter register, to an input of said first register, acting as a counter register, and said second switch connects an output of said first register to the input of said third register acting as a control status register;
   a central processing unit connected to each of said first through fourth registers through a data bus for enabling independent data communication between said central processing unit and said first through fourth registers;
   whereby said first and second registers are integrally operated by said central processing unit to carry out a reload-timer function or a counter function selectively in accordance with information stored in said third and fourth registers.

2. A circuit as set forth in claim 1, wherein said first and second switches are controlled in accordance with information supplied by said fourth register acting as a mode register.

3. A circuit as set forth in claim 2, wherein, in the reload-timer mode, said first register acts as a data register for a reload and said fourth register acts as a mode register for specifying the reload timer mode.

4. A circuit as set forth in claim 3, wherein said control means selects an internal clock as said clock signal.

5. A circuit as set forth in claim 4, wherein said first register and said second register are connected to said fourth register via respective mode switching lines, the fourth register is further connected to said control means via an operation control line, the control means is further connected to said third register via a start control line, and the first, second, and fourth registers are controlled by the third register via respective control lines.

6. A circuit as set forth in claim 3, wherein and said first switch comprises complementary first and second AND gates, said second switch comprises complementary first and second AND gates and an OR gate receiving outputs from the first and second AND gates, in which only the first AND gate of the first switch is opened to connect said second register to the first AND gate of the second switch, the output of the AND gate of the second switch is connected, via the OR gate, to the input of said third register.

7. A circuit as set forth in claim 2, wherein in the counter mode, said fourth register acts as a mode register for specifying the counter mode.

8. A circuit as set forth in claim 7, wherein said control means selects an external clock as said clock signal.

9. A circuit as set forth in claim 8, wherein said first register and said second register are connected to said fourth register via respective mode switching lines, the fourth register is further connected to said control means via an operation control line, the control means is further connected to said third register via a start control line, and the first, second and fourth registers are controlled by the third register via respective control lines.

10. A circuit as set forth in claim 7, wherein and said first switch comprises complementary first and second AND gates said second switch comprises complementary first and second AND gates and an OR gate receiving outputs from the first and second AND gate, in which only the second AND gate of the first switch is opened to connect said second register to said first register in series, the output of the fist register is connected, via the second AND gate and the OR gate of the second switch, to the input of said third register.

11. A circuit as set forth in claim 1, wherein, in the reload-timer mode, said first register acts as a data register for a reload of data to said second register, the second register acts as a counter register, said third register acts as a control status register and said fourth register acts as a mode register.

12. A circuit as set forth in claim 11, wherein each of said first third, and fourth registers is constructed by a plurality of latch stages, each of the latch stages is connected independently to said data bus, the latch stages for constructing the first, third, and fourth register, are formed as register cells, where there is no carry transfer between each pair of adjacent latch stages from a lower bit side latch cell to a higher bit side latch cell, while the latch stages for constructing the second register, are formed as counter cells, where a carry transfer is carried out between each pair of adjacent latch stages from a lower bit side latch stage to a higher bit side latch stage.

13. A circuit as set forth in claim 11, wherein said control means selects an internal clock as said clock signal and supplies the same, via a clock line, to said second register.

14. A circuit as set forth in claim 11, wherein said control means selects an external clock as said clock signal and supplies the same, via a clock line, to said second register.

15. A circuit as set forth in claim 14, wherein said second register functions as a counter instead of the reload-timer.

16. A circuit as set forth in claim 1, wherein, in the counter mode, said first register acts as a counter register, said second register acts also as a counter register, said third register acts as a control status register and said fourth register acts as a mode register.

17. A circuit as set forth in claim 16, wherein each of said first and second register is constructed by a plurality of latch stages, each of the latch stages is connected independently with said data bus, the latch stages for constructing each of the first and second registers, are formed as counter cells, where a carry transfer is carried out between each pair of adjacent latch stage from a lower bit side latch stage to a higher bit side latch stage, while the latch stages for constructing the third and fourth registers, are formed as register cells, where no carry transfer is carried out between each two adjacent latch stages from a lower bit side latch stage to a higher bit side latch stage.

18. A circuit as set forth in claim 16, wherein the most significant bit of said second register is connected to the least significant bit of said first register.

19. A circuit as set forth in claim 18, wherein said control means selects an external clock as said clock signal and supplies the same, via a clock line, to said second register.

20. A circuit as set forth in claim 18, wherein said control means selects as internal clock as said clock signal and supplies the same, via a clock line, to said second register.

21. A circuit as set forth in claim 20, wherein said second register functions as a timer instead of the counter.

22. A circuit as set forth in claim 1, wherein said reload-timer/counter circuit is mounted in a part of a peripheral unit formed inside a one-chip microcontroller which is set up with at least a central processing unit, a read-only memory and a random-access memory. switching means for selectively connecting the output of said second register to either the input of said third register or the input of said first register; and 23. A reload-timer/counter circuit comprising:
a first register holding an initial value for a timer operation in a reload-timer mode and counting a first clock signal as a first portion of a counter in a counter mode;
a second register, said second register being operative counting in response to a second clock signal from the initial value loaded from said first register in said reload-timer mode and counting in response to the second clock signal and supplying a carry signal as the first clock signal to said first register as a second portion of a counter in said counter mode;
a means for supplying the second clock signal to said second register;
a third register, operatively connected to said first and second registers, storing data for activating a reload-timer/counter operation;
a fourth register connected to said first and second registers to supply mode data thereto, for storing a mode data for switching in mode between said reload-timer mode and said counter mode; and
a switching means, operatively connected to said first, second and third registers, for selectively connecting an output of said second register to either an input of said first register or an input of said third register in accordance with said mode data.

24. A reload-timer/counter circuit comprising:
a first register holding an initial value for a timer operation in a reload-timer mode and counting a first clock signal as a first portion of a counter in a counter mode;
a second register counting in response to a second clock signal from the initial value loaded from said first register in said reload-timer mode and counting in response to the second clock signal and supplying a carry signal as the first clock signal to said first register as a second portion of a counter in said counter mode;
control status register selectively connectable to said first and second registers for storing the output of said first register of said second register;
a means for supplying the second clock signal to said second register;
a mode register means connected to said first and second registers to supply mode data thereto, for storing a mode data for switching in mode between said reload-timer mode and said counter mode; and
a switching means, operatively connected to said first and second registers, for selectively connecting the output of said second register to either an input of said first register or an input of said control status register in accordance with said mode data.

25. A reload-timer/counter circuit comprising:
a clock selector selecting one of clock signals;
a first register holding an initial value for a timer operation in a reload-timer mode and counting a first clock signal as a first portion of a counter in a counter mode;
a second register counting in response to an output of said clock selector from the initial value loaded from said first register in said reload-timer mode and counting in response to the output of said clock selector and supplying a carry signal as the first clock signal to said first register as a second portion of a counter in said counter mode;
a control status register selectively connectable to said first and second registers for storing the output of said first register or said second register;
a mode register means connected to said first and second registers to supply mode data thereto, for storing a mode data for switching in mode between said reload-timer mode and said counter mode; and a switching means, operatively connected to said first and second registers, for selectively connecting the output of said second register to an input of said first register or an input of said control status register in accordance with said mode data.

26. A one-chip microcontroller, comprising:

a processing unit;

a data bus;

a first register holding an initial value, transferred from the processing unit via said data bus, for a timer operation in a reload-timer mode and counting a first clock signal as a first portion of a counter in a counter mode;

a second register, connected to said processing unit via said data bus, counting in response to a second clock signal from the initial value loaded from said first register in said reload-timer mode and counting in response to the second clock signal and supplying a carry signal as the first clock signal to said first register as a second portion of a counter in said counter mode;

a control status register selectively connectable to said first and second registers, for storing the output of said first register or said second register;

a means for supplying the second clock signal to said second register;

a mode register means, connected to said first and second registers to supply mode data thereto and to said processing unit via said data bus, for storing a mode data transferred from said processing unit for switching in mode between said reload-timer mode and said counter mode; and a switching means, operatively connected to said first and second registers, for selectively connecting the output of said second register to either an input of said first register or an input of said control status register in accordance with said mode data.

27. One-chip microcontroller comprising:

a processing unit;

a first register holding an initial value, transferred from the processing unit, for a timer operation in a reload-timer mode and counting a first clock signal as a first portion of a counter in a counter mode;

a second register, connected to said processing unit via a data bus, counting in response to a second clock signal from the initial value loaded from said first register in said reload-timer mode and counting in response to the second clock signal and supplying a carry signal as the first clock signal to said first register as a second portion of a counter in said counter mode;

a means for supplying the second clock signal to said second register;

a third register selectively connectable to said first and second registers, for storing the output of said first register or said second register;

said data bus interconnecting said processing unit, said first register, and said second register; and a switching means, under control of said processing unit via a mode register, for connecting said second register to supply said carry signal to said third register and for causing said initial value stored in said first register to be loaded into said second register in the reload-timer model and for connecting said first register to said second register serially for supplying the carry signal from said second register to said first register in said counter mode.

* * * * *